US008458150B2

(12) United States Patent
Holenstein et al.

(10) Patent No.: US 8,458,150 B2
(45) Date of Patent: Jun. 4, 2013

(54) METHOD AND ARTICLE OF MANUFACTURE FOR ENSURING FAIR ACCESS TO INFORMATION USING A FAIR PROPAGATION DELAY PERIOD IN A TRANSACTION OWNERSHIP STEP

(75) Inventors: Paul J. Holenstein, Downingtown, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

(21) Appl. No.: 13/558,598

(22) Filed: Jul. 26, 2012

(65) Prior Publication Data

US 2012/0290548 A1    Nov. 15, 2012

Related U.S. Application Data

(63) Continuation of application No. 13/530,602, filed on Jun. 22, 2012, which is a continuation of application No. 12/106,006, filed on Apr. 18, 2008, now abandoned.

(51) Int. Cl.
*G06F 7/00* (2006.01)
*G06F 17/00* (2006.01)
*G06F 15/16* (2006.01)

(52) U.S. Cl.
USPC .......................................... 707/703; 709/229

(58) Field of Classification Search
USPC .......................................... 707/703; 709/229
See application file for complete search history.

(56) References Cited

U.S. PATENT DOCUMENTS

| 5,615,373 | A | | 3/1997 | Ho |
| 5,857,009 | A | * | 1/1999 | Handig ...................... 379/32.01 |
| 5,913,213 | A | * | 6/1999 | Wikstrom et al. ............ 707/610 |
| 7,529,844 | B2 | * | 5/2009 | Radovic et al. ............... 709/229 |
| 2007/0083521 | A1 | * | 4/2007 | Diedrich et al. ................ 707/10 |
| 2009/0265352 | A1 | | 10/2009 | Holenstein et al. |

OTHER PUBLICATIONS

U.S. Appl. No. 13/530,602 by Holenstein, filed Jun. 22, 2012.

* cited by examiner

*Primary Examiner* — Etienne Leroux
*Assistant Examiner* — Chelcie Daye
(74) *Attorney, Agent, or Firm* — Panitch Schwarze Belisario & Nadel LLP

(57) ABSTRACT

A method of performing transactions in accordance with fairness criteria is provided wherein one of a plurality of entities initiates a transaction on an object at a database. The steps or operations of the initiated transaction are immediately processed up to the transaction ownership step. Propagation delays are determined between the database and at least some of the other entities that are capable of initiating transactions to the database. The propagation delays and a fairness criteria is used to determine the fair propagation delay period. Upon determining that the fair propagation delay period has been exceeded, it is detecting whether any of the other entities initiated a transaction on the same object during the fair propagation delay time period. If not, then the transaction initiating entity performs the transaction ownership step on the initiated transaction.

18 Claims, 16 Drawing Sheets

Lock Synchronization Logical Flow

Remote Access to an Application Database

**An Unfair System

Measuring Round-Trip Channel Time

**Distributed Users

Distributed Servers with Direct-Attached Storage

Single Node Remote Access

**Client Monitoring Logic Flow

**Server Monitoring Logic Flow

Data Locality via Distributed Database

Lock Synchronization Logical Flow

Preprocessing Logic Flow

Remote Processing, Remote Response

Remote Processing, Local Response

Local Processing, Remote Response

Local Processing, Local Response

**Fairness Criteria Resolving Element

METHOD AND ARTICLE OF MANUFACTURE FOR ENSURING FAIR ACCESS TO INFORMATION USING A FAIR PROPAGATION DELAY PERIOD IN A TRANSACTION OWNERSHIP STEP

CROSS-REFERENCE TO RELATED APPLICATIONS

This application is a continuation of co-pending U.S. application Ser. No. 13/530,602 filed Jun. 22, 2012, which, in turn, is a continuation of U.S. application Ser. No. 12/106,006 filed Apr. 18, 2008, now abandoned. The entire disclosures of both of these applications are incorporated herein by reference.

BACKGROUND OF THE INVENTION

Today, there are many applications that require fair access to information or processing services provided by an application. Fair access implies that no user has preferential access to the information or services in the database. A level playing field is created for all users.

As an example, fair access might be defined by the requirement that the time to query or to update database information is the same for all users, regardless of their location. For instance, a stock market trading system must provide, often by regulation, the same access time to market information and to the market's trading functions for all users. Otherwise, users with faster access will have a marked advantage over those with slower access. This is especially important when computers rather than people are doing the trading because of the computer's extremely fast decision times.

Fair access is defined by a fairness criteria policy. This policy may simply state that all users are to be provided the same access. Alternatively, it may require that some users be given priority over other users in that high-priority users are guaranteed faster access to data than other users. Still another policy may require that each user have access to data changes after some fixed time delay specified for that user. The fairness criteria might be predetermined, or it could be dynamic, changing under certain conditions or as business rules dictate.

Unless special measures are taken, user access is impacted by communication delays in the network connecting the user to the data-processing system. Application-processing delays or other system delays may also play a role. Round-trip communication delays from when a request is made to when a reply is received typically range from almost zero to hundreds of milliseconds, depending upon the distance of the user from the data processing site, upon the data processing time, and upon the nature of the communication channels and equipment connecting the user to that site. Communication delays are dynamic. They can vary as network or load conditions vary. Any fairness methodology must compensate for these variations to meet the fairness criteria.

1. Global Access to Information

Today's communication and data processing technologies allow users around the world to access a common online database so that they can all participate in a common application. An online database is one that is accessible in real time by external entities over a communication network. Online databases are typically, but not necessarily, stored on persistent storage such as disk. However, an online database might be stored in volatile memory for performance purposes. An example of the use of online database technologies is an online retail store such as Amazon.com. A user anywhere in the world can browse Amazon's inventory of goods and can purchase those items via credit card or via an intermediate payer such as PayPal®.

Users connect to remote database servers via communication channels, which are typically provided by common carriers. Much of today's communication is done over the Internet, which provides reasonably reliable and low-cost communication channels to users working at their PC or workstation browsers. In addition, there are many other types of communication channels in use, both over public networks and over private networks.

Communication between a user and a remote data-processing center is accomplished by exchanging messages. In a typical interaction, a user sends a message to a remote server requesting some service. The server then responds with a message providing the requested information or confirming the completion of the requested action (FIG. 1).

The time that it takes to pass a message between a user and a server is called the "propagation delay" and is limited by the speed of light. It takes light about five milliseconds to travel 1,000 miles in a vacuum. In fiber or copper wire, it takes about twice as long, or about 10 milliseconds per 1,000 miles. Thus, a message traveling from London, England, to Sydney, Australia—about 12,000 miles apart, will take about 120 milliseconds over fiber or copper cable. This propagation delay is magnified even further by delays through repeaters and through other electronic equipment used in the channel to enhance signal quality. Furthermore, most interactions comprise a request followed by a response and entail a round trip over the communication channel. In this case, the round-trip time between London and Sydney may be 240 milliseconds or more.

2. Fair Access to Information

In many applications, such propagation delays are immaterial. If a user at a browser is expecting a response in two or three seconds, a few hundred extra milliseconds may not be noticeable. In these systems, as soon as the data is received by a system, it is available to the system's users. However, in some applications, users are competing with each other, and thus the propagation delays may be very important. More to the point, if one user is close to the database and has much faster access than a user remote from the database, the user that is closer may have an advantage referred to herein as an "unfair advantage."

An example of this problem is an auction market. In such markets, an item of some sort is put up for sale. Bidders then compete with each other for the item. The highest price wins the auction. Similarly, an item might be requested and bidders compete to sell that item to the requester at the lowest price that they are willing to sell it. If some bidders have very fast (say millisecond) access to the market, they are in a much better position to bid than are others with much slower access (say seconds). In such a case, this is an unfair market. It gives an advantage to certain bidders over others.

Contemporary examples of auction markets are Internet auction sites such as eBay®, in which a wide variety of objects are put up for sale. These markets are generally manual in that competing bidders are interfacing to the market via their keyboards. Those with faster access can bid more quickly than those with slower access, thereby leading to an unfair advantage.

A more critical case is that of computer trading. If computers are monitoring the market and are automatically making bids, trading activity occurs at a much higher rate—perhaps significantly faster than the differences in access times. Differences measured in milliseconds can be critical. Differences measured in hundreds of milliseconds can make the market untenable. An example of computer trading is a stock market. In this case, a few millisecond advantage can have a tremendous financial value to the lucky trader.

FIG. 2 illustrates an example in which traders are trading on two different stock exchanges located thousands of miles apart. Consider two hypothetical stock exchanges—one in London, England, and one in Sydney, Australia—each with a local trading system that allows traders to obtain price quotations and to execute trades against a local database containing the market data for that exchange. To get price quotations and to execute trades on the London-based stock exchange, traders in London will have very fast access to the market data—typically in the order of a few milliseconds (1). However, using the London/Sydney round-trip signal propagation time developed above, it can take on the order of 240 milliseconds or more for a trader in Australia to make a trade on the London-based exchange (2). The reverse holds true for executions (3) and (4) against the Australian-based market. In either case, traders using their local exchange have an unfair advantage over those traders who are remotely located. Many markets would consider this is an unfair system. The differences in access times to the application database for different users can be orders of magnitude apart, depending upon where the users are located.

As a consequence, many stock exchanges are affected by regulations that govern the allowable differences in access times across the trading community. All traders must suffer substantially the same delay. If one community of traders has an access time to the system of 240 milliseconds, then all traders must suffer this access time no matter where they are located. These systems must provide fair access to all of the information distributed across the network to all users.

This is only one example of an application in which fairness criteria may be imposed. Any application that pits one user or group against others is a candidate for enforcing fairness. The fairness requirement extends from auction markets of various forms to many other applications, such as online games.

3. Determining Propagation Time

In order to achieve a fair system, it is necessary to be able to measure the propagation delays between two or more systems. Propagation delays may be caused by delays through the communication channel or by delays in the application. If the systems are geographically separated, communication delays will generally be predominant as they will be measured in milliseconds as compared to microseconds for application delays. However, if systems are collocated, application delays may predominate. Communication propagation delay may be measured in several ways using currently known methodologies, as described next.

a. Accurate Clocks

If all systems in the network use accurate clocks, then it is only necessary for one system to send a timestamped message to a second system. The second system notes the time of receipt of the message and calculates the communication propagation delay by subtracting the time that the message was sent from the current time. Likewise, the original system can determine the channel propagation delay between it and the second system from a timestamped message sent to it by the second system. In this way, each system in the network can determine the propagation time to it from every other system in the network. Systems may then exchange these propagation delays so that all systems know the propagation time along any path in the network. In order to be accurate, a clock must be initially set properly, and it must not drift. Accurate time sources include atomic clocks, radio broadcasts (such as from WWV or WWVB in Colorado), Loran, and GPS.

b. Synchronized Clocks

The systems may use software synchronization techniques to keep all of their clocks synchronized with each other and, optionally, synchronized with an accurate clock (or with the average time of several accurate clocks). A common software synchronization technique in use today is the Network Time Protocol, or NTP. Via timestamped messages exchanged between systems, NTP can determine how far apart their clocks are from each other. It then can speed up or slow down the clock of one system to synchronize it with another. NTP organizes systems into a hierarchical tree, where each level of the tree is known as a stratum. Stratum 0 systems have accurate clocks. Stratum 1 systems synchronize with Stratum 0 systems, Stratum 2 systems synchronize with Stratum 1 systems, and so on. The further down the chain a system is, the less accurate the system's clock. However, NTP synchronization error is generally measured as a few milliseconds.

If there is no Stratum 0 system in the network, the systems are time-synchronized with each other but not with real civil time. However, they can each still interact with each other on the same relative time scale.

c. Unsynchronized Clocks

In many geographically distributed systems, the system clocks are not synchronized with each other. There may be inter-clock divergences of many seconds or more. However, in this case, the round-trip channel propagation may still be accurately determined by using the procedure used by NTP. See NTP RFC 1305, http://WorldWideWeb.eecis.udel.edu/~mills/database/rfc/rfc1305.

Referring to FIG. 3, System 1 sends a message with its current timestamp, T1, to System 2. Upon receipt, System 2 timestamps the message with timestamp T2. It then returns the message to System 1 with a timestamp, T3, of the time of its transmission. System 1 notes the time, T4, that it receives the returned message from System 1.

It is now known that it took T4−T1 seconds for the message to travel from System 1 to System 2 and back to System 1. Furthermore, System 2 held the message for a time of T3−T2 seconds. Therefore, the round-trip time attributable to communications is $$\text{round-trip time} = (T4-T1)-(T3-T2)$$

Assuming that the communication channel is symmetric—that is, that the communication propagation delays are the same in each direction, then $$\text{channel propagation time} = (\text{round-trip time})/2$$

This procedure results in accurate round-trip times even if the System 1 and System 2 clocks are not closely synchronized. However, this procedure has several sources of error, which can be corrected to a large extent:

Channel Asymmetry—The calculation of channel propagation time from the round-trip time assumes that the channel is symmetric. That is, the communication delay in each direction is the same. This condition can be met by ensuring that the communication channels in each direction are configured the same. The channels in each direction should use the same common carrier or private services, and the communication channel distance should be the same in both directions.

Variable Propagation Time—In some networks, and especially over the Internet, the channel propagation delay can vary over time. This can be caused by changes in routing through the network or by network congestion. In these cases, the channel propagation time should be measured periodically (typically every few minutes). Alternatively, the channel propagation time could be measured at the initiation of each change sequence (a transaction) or upon each connection made between the systems over the communication channel. Rather than simply accepting the last measurement, the average of the last few measurements can be used to filter out transient changes in the propagation delay.

d. Collocated Systems

If two or more systems are collocated, the communication propagation delay between them may be negligible; and delays within the application may become predominant. Application delays can be measured by routing the timing message described above through the application. The receipt of the system of the timing message and its retransmission are still noted by the timestamps T2 and T3. However, the time from T2 to T3 now includes the application time.

This same procedure can be used when the communication and application delays are comparable, as it will give a round-trip time that includes both communication delays and application delays.

4. Differential Delay

There are several prior art system and network architectures that can be used to ensure fairness. All utilize techniques that delay information access to the lowest common denominator. That is, all users must experience the same delays in obtaining access to the application data. Users who have fast access must have that access slowed to the access time of the user with the slowest access.

In the case of a single server (FIG. 4), this is done by measuring the propagation delay from the server to each client system (that is, the user's system) as described above with reference to FIG. 3. Then a differential delay is calculated for each client. A client's differential delay is the maximum client delay of all clients in the network minus the client's own delay:

Differential delay for a client=maximum client propagation delay−this client's propagation delay.

The differential delay for a client is the amount of time that must be inserted into a client's request path and response path so that the time for the server to receive a request from any client is the same and so that the time for each client to receive a response from the server is the same.

For instance, if there are three clients, and if the propagation delay from each client to the server is as shown in the following table, the differential delays are those shown. In this case, the client with the longest propagation delay is Client 2 with a delay of 120 milliseconds. Since Client 1 only has a 30 millisecond propagation delay, its requests and its responses must be delayed by 90 milliseconds before being processed or delivered in order to provide fair access relative to Client 2. 90 milliseconds is Client 1's differential delay. Likewise, Client 3 has a differential delay of 40 milliseconds.

|  | Propagation Delay (msec.) | Differential Delay (msec.) |
| --- | --- | --- |
| Client 1 | 30 | 90 |
| Client 2 | 120 | 0 |
| Client 3 | 80 | 40 |

If there are multiple nodes and database copies in the network, as shown in FIG. 5, then the servers must calculate not only the differential delays between themselves and their clients, but also between each other. This more complicated case is discussed later.

a. Client Monitoring

Perhaps the simplest network architecture to be considered is that of a single database that is accessed by a single server supporting users spread over a large geographic range. As simple as this architecture is to describe, the application of fairness to it is not so simple.

FIG. 6 shows such a network architecture with a system located in New York. A community of one or more users is located locally in New York, and others are located remotely in London and in Shanghai. Clearly, the local users in New York will probably have faster access to data and services than those in London and Shanghai. Furthermore, London users are likely to have faster access than Shanghai users. In this architecture, fairness can be achieved by shifting the responsibility for fairness to the user terminals (or computers, if the "users" are, in fact, computers). Collectively, they can be called endpoints clients. Clients request services of the central server.

The first step, as shown in FIG. 7, is for the server to measure the channel propagation delays to each of its clients. It then calculates the differential delay for each client and sends this value to each client. It may do this periodically, and it may average several measurements to arrive at the current propagation delays.

Each client receives from the server its differential delay time by which it must delay its requests and responses. The client delays the transmission of all of its requests to the server by the differential delay time. When a response is received to a request, the client will delay the processing of that response by the differential delay. In this way, all clients will suffer the same delay in getting a request to the server and will then suffer the same delay in receiving the response from the server.

Alternatively, the server could measure the client channel propagation times and send only the maximum propagation time to all clients. Each client would then measure its own propagation time and calculate its own differential delay.

Using this latter algorithm as an example, as shown in FIG. 6, assume that New York clients measure a propagation delay of ten milliseconds, that London clients measure a propagation delay of 60 milliseconds, and that Shanghai clients measure a propagation delay of 200 milliseconds. Upon receiving these delay time reports, the server will send a 200 msec. maximum delay directive to all clients. Consequently:

i. The New York clients will calculate a differential delay of 190 milliseconds. They will delay all requests by 190 milliseconds, leading to a delay time for requests received at the server of 200 msec. Responses from the server will likewise be delayed by 190 milliseconds, leading to a response delay time of 200 msec.

ii. The London clients will calculate a differential delay of 140 milliseconds. They will delay all requests by 140 milliseconds, leading to a delay time for requests received at the server of 200 msec. Responses from the server will likewise be delayed by 140 milliseconds, leading to a response delay time of 200 msec.

iii. The Shanghai clients will calculate a differential delay of zero milliseconds. Therefore, it will take approximately 200 msec. for their requests to arrive at the server and another 200 msec. for them to receive the replies.

Since all clients experience the same delay (in this case, 200 msec. in each direction), the system is fair.

b. Server Monitoring

Alternatively, as shown in FIG. 8, the same result can be obtained by having the server delay all requests and responses from and to a given client by the calculated differential delay, thus relieving the clients of having to make this adjustment.

c. Read-only Locality—Tightly Clustered Users

If fairness is enforced via client or server monitoring, a single server node system imposes the maximum transaction response time on all clients in the system for queries, services, and updates. This penalty can be relaxed by providing additional local servers with a read-only copy of the database close to each community of users. One of the servers is designated as the master node, at which all updates are made. The other servers can be considered slave nodes.

Changes made to the database as a result of updates to the master node are replicated in real time to all of the slave nodes with appropriate fairness delays, where they are applied to the local database copies and are available to the local community of users. These users can read data very quickly (such as getting a stock quote) since the data is local to them, but they must communicate over the network in order to effect a database update (such as executing a trade).

For instance, FIG. 9 shows the single-node system of FIG. 6 expanded to accommodate local nodes in London and Shanghai. The New York node is the master node. There are slave nodes located in Shanghai and in London. If a client in Shanghai or London needs to update the database, its server sends that update to the New York server (1). The New York server will update its database (2) and will then replicate the database changes to Shanghai and London (3).

Provided that all clients are collocated with their nodes (that is, they form tight clusters) so that their propagation times can be ignored, the result is that all clients have fair read-only access to application data that already has been published. Their only reading delays are that of sending read requests to their local servers and of receiving the responses from those servers. Information access will be substantially the same for all clients.

However, unless special steps are taken, the execution of requests requiring database updates may not be fair. New York clients have direct access to the master database for updates, whereas London and Shanghai clients must send update requests across the network. Therefore, updates will reach the New York database before they reach the London or Shanghai databases. Consequently, New York users will see newly published data before their peers in London or Shanghai.

This problem can be solved by having the servers monitor communication delays between each other in a manner analogous to the client monitoring technique described earlier. In this case, the servers impose differential delays on update requests and responses so that all update requests and responses are delayed by the same amount of time from when they were made. In this way, it is ensured that data updates are published fairly.

Using this method, each remote slave server monitors the communication delay between it and the master server. Periodically, the slave servers report their measured delays to the master, which will broadcast the largest such delay to all slave servers. Each slave server, as well as the master server, will calculate its own differential delay based on the maximum delay and will delay its requests and its responses (or the processing of each) by the differential delay, as described previously. In this way, all requests are received and processed by the master server fairly, and all responses are published fairly.

Alternatively, the master server can monitor the communication delays between itself and each of the slave servers. It will then delay each request from a specific slave and each of its responses to that slave by the differential delay time between it and that slave. It will also delay its own requests and responses by its differential delay (which will be equal to the largest propagation time from itself to any of the slave servers).

Since all clients have local read-only access to the information in the database, they can all read information which is already in the database with substantially the same delays. This is fair read access. Also, all updates will be made visible at all nodes at the same time so that fair access to changed (manipulated) data is provided. The result is a fair system.

d. Read-only Locality—Loosely Clustered Users

Client monitoring can be extended in this architecture to provide fairness to clients that are not local to a node. Consider a case in which several slave nodes provide database access services to communities of clients but in which the clients are geographically dispersed and are at different distances from their serving nodes. Even though the nodes may be issuing requests and receiving responses fairly, this does not mean that all clients are being treated fairly since some of them may be at a greater distance from their serving nodes than other clients.

This situation can again be corrected via client monitoring, as described earlier. In addition to the slave nodes monitoring communication delays to the master node (or the master node measuring these delays), each client will also monitor communication delays to its serving node and will report these delays to its node (or the serving node can calculate this delay with its clients). When a slave node reports communication delays to the master node, it will report not only its communication delay but also the maximum communication delay measured by its own clients.

As before, the master node will broadcast the maximum nodal communication delay to all nodes. Each node will calculate its own differential communication delay, which it will use to delay requests and responses between itself and the master node for fairness. In addition, the master node will also broadcast to the slave nodes the maximum overall delay separating a client from its serving node.

Each node, including the master node, will send to its clients the maximum client/server delay in the entire network. The clients will use this information to calculate an additional differential delay that they will use to further delay requests and responses. This differential delay will be the difference between the maximum client/server delay and its own delay to its server. Alternatively, the slave nodes can impose these delays in their own processing so that the clients are not involved in the process.

For instance, with respect to FIG. 9, assume that the communication propagation delays between the slave nodes and the master New York node are as shown in FIG. 6—60 msec. for the London node and 200 msec. for the Shanghai node. Furthermore, assume that the furthest client is a Chinese client that is another 100 msec. from the Shanghai node.

The master node, as described above, will broadcast a maximum nodal delay of 200 msec. and a maximum client delay of 100 msec. to all slave nodes. The nodes will add differential delays based on the maximum nodal delay, discussed earlier, to all requests and responses. For instance, the London node will delay its requests and responses by 140 msec., as described above (200-60).

Consider a client that is served by the London node. This client must ensure that it imposes an additional 100 msec. delay on each request and on each response to match that of the furthest Chinese node. If the London client has a 10 msec. delay in its connection to the London node, the client must impose an additional 90 msec. delay on its requests and responses.

Alternatively, these delays could be calculated and imposed by the slave nodes. Nodal calculations of delays may be a more secure way to achieve fairness in that it precludes fraudulent calculations by clients to enhance their own access.

By imposing this timing condition on each client in the system, all responses and requests will be delayed by the same total amount; and information access, both query and update, is fair.

In the example described above with 300 milliseconds of total delay time, with respect to the London client, there will be a 60 msec. delay from the New York server to the London server, a 140 msec. delay inserted by the London server, a 10 msec. delay from the London server to the client, and a 90 msec. delay inserted by the client, yielding a total delay of 300 msec.

State-of-the-art methods work fine for single databases. What is needed are methods that work for multiple databases or that are more efficient for single databases.

BRIEF SUMMARY OF THE INVENTION

In one preferred embodiment of the present invention, locks placed on corresponding objects held in a plurality of databases located at different nodes in a network during replication are released in accordance with fairness criteria. Propagation delays are determined between a transaction initiating node and one or more other nodes in the network. An object is locked during a transaction being executed at the transaction initiating node. Corresponding objects are locked at one or more other nodes in the network that are manipulated as a result of the replication. Upon determining that the object locks should be released, the propagation delays are used to determine when to release the object locks so that all of the object locks at the one or more other nodes are released in accordance with the fairness criteria.

In another preferred embodiment of the present invention, transactions are performed on objects held in a database in accordance with fairness criteria, wherein two or more entities are capable of initiating transactions to the database. Each transaction includes one or more transaction steps or operations and a transaction ownership step. The fairness criteria defines rules for determining a fair propagation delay time period that must pass after transaction initiation. One of the entities initiates a transaction on an object at the database. The steps or operations of the initiated transaction are immediately processed up to the transaction ownership step. Propagation delays are determined between the database and at least some of the other entities that are capable of initiating transactions to the database. The propagation delays and the fairness criteria are used to determine the fair propagation delay period. Upon determining that the fair propagation delay period has been exceeded, it is detected as to whether any of the other entities initiated a transaction on the same object during the fair propagation delay time period, and if not, then the transaction initiating entity performs the transaction ownership step on the initiated transaction.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

DETAILED DESCRIPTION OF THE INVENTION

Figure 1:
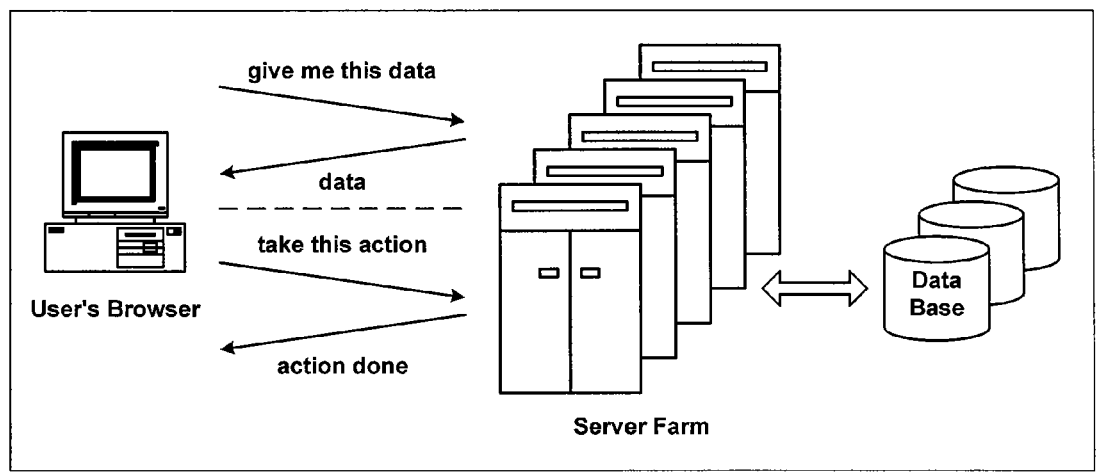
FIGS. 1 and 2 show various hardware architectures for accessing databases.
Figure 2:
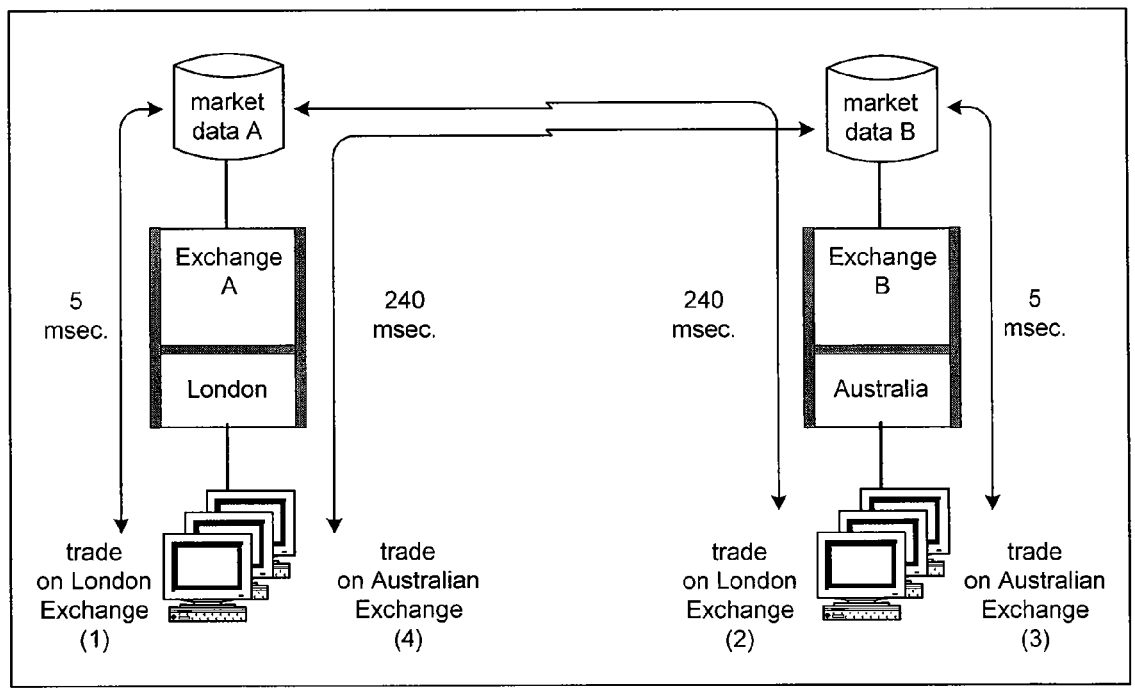
Figure 3:
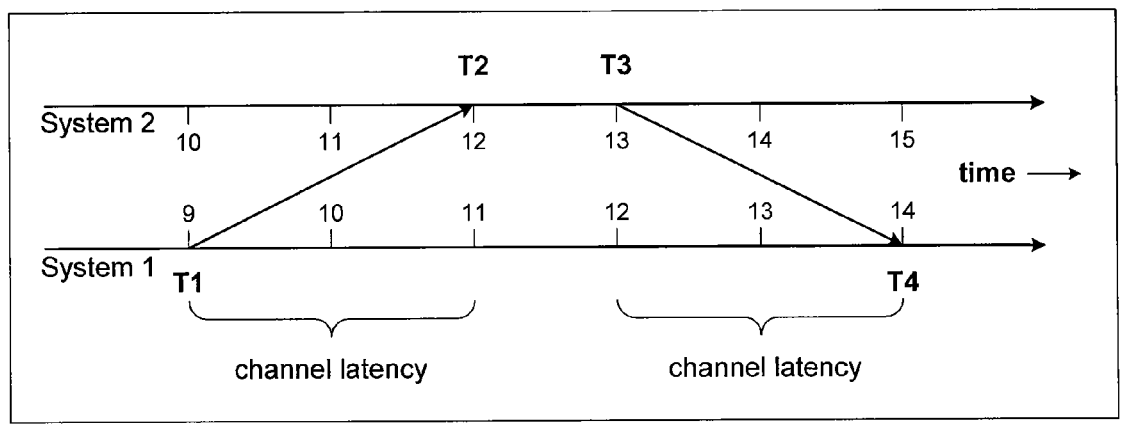
FIG. 3 shows how to measure round-trip channel time.

Certain terminology is used herein for convenience only and is not to be taken as a limitation on the present invention.
I. Overview In one preferred embodiment of the present invention, fairness is achieved by measuring the communication delay between the various components of the system and by injecting artificial delays to slow down access by users with rapid access so that their access times comply with the fairness criteria. Access control is accomplished by controlling the timing of lock releases on data objects.

In another preferred embodiment of the present invention, processing efficiency and security are improved by preprocessing a request as soon as it is received by a server, but the distribution of the results are delayed until it is assured that no other request preceded this request. If an earlier request is received by the server, then results of the original request are modified to give priority to the earlier request.

Current methods to assure fairness require that the system clocks be synchronized. System clock synchronization is a complex, costly, and inexact technology. The methods disclosed in the present invention do not require that the clocks of the systems in the network be synchronized.
II. Detailed Disclosure The description below teaches how the determination of channel propagation time can be used to guarantee fair access to all users in a distributed system without the need for the system clocks to be synchronized. Differential delays are used to synchronize the release of locks on updated data items across the network.

The description below also teaches how to improve efficiency of a fair system by preprocessing transactions but withholding the results until it is assured that no earlier transactions had been generated elsewhere in the network. If an earlier transaction is detected, the results of the transaction processing are reassigned to reflect the proper order of transaction execution.

1. Fairness Criteria

In a system that requires a degree of fair access, a "fairness criteria" must be defined. The fairness criteria describes or otherwise makes known the conditions that the system must meet and the business rules that must be followed in order to be a fair system for a given application. More specifically, it defines the extent to which the provision of application services, the updating of the database, and the access of information from the database must be controlled so that all users are treated according to the fairness criteria. This typically involves defining the access and update timing relationships among the users of the system.

Fairness criteria could include any of the following:

a. All user database access times must be within a specified tolerance of each other. For instance, the time from when a user issues an update request to the database to the time that the update is applied will be within ten milliseconds for all users (that is, the fairness criteria is that all object locks are released within a predetermined time window of each other). The time from when a read request is made of the database to the time that the user receives the data will be within five milliseconds for each user.

b. The average or median time that a request is delayed is the same for all users. For instance, database requests will be delayed by an average of 200 milliseconds for each user.

c. The maximum time that a request is delayed will be no greater than a defined limit. For instance, no request will be delayed by more than 500 milliseconds. Alternatively, 95% of all requests will be delayed by no more than 500 milliseconds.

d. The data update will be made available at some time in the future. For instance, at 8 AM, it might be announced that this data will become available to users at 9 AM.

e. Data updates will be made available on a priority basis. For instance, System 1 will be guaranteed to receive the data changes (i.e. "manipulations") before System 2. Alternatively, System 1 will receive data changes two seconds prior to System 2.

f. Data will be made on a subscription basis, or as a "service level". Each user is entitled to receive new information after some delay as specified for that user. For instance, some users may receive new information immediately, whereas other users at a different service level might have to wait fifteen minutes before they can have access to that information. Thus, selected nodes may have predefined service levels, and the fairness criteria is that all object locks are released based on a priority order determined by the service levels of the nodes.

g. The fairness criteria might by dynamic and change according to certain conditions.

h. Other fairness criteria might be established according to business rules pertinent to the application.

2. Fairness Strategy

Figure 4:
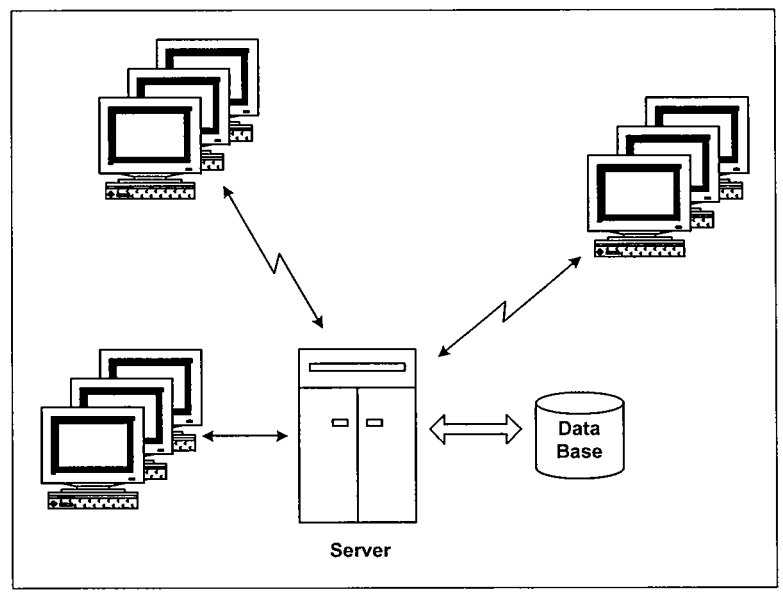
FIGS. 4-6 show additional hardware architectures for accessing databases.
Figure 5:
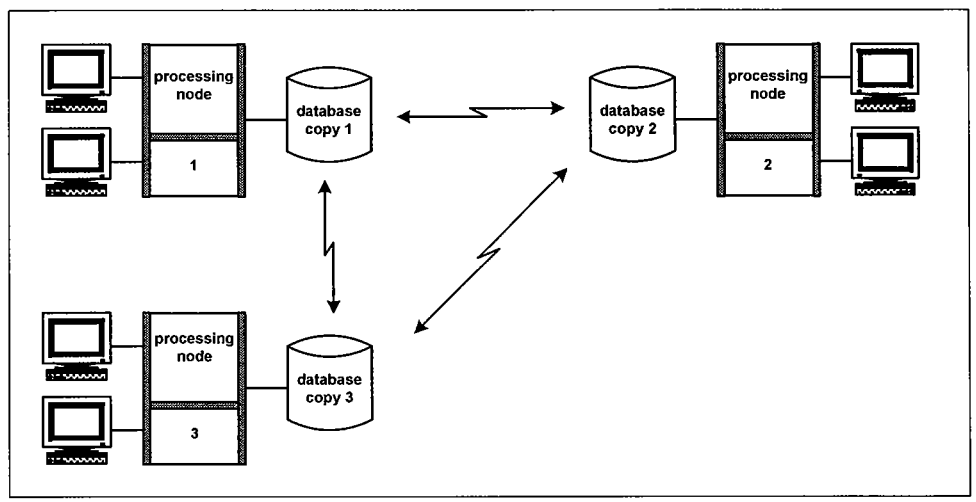
Figure 6:
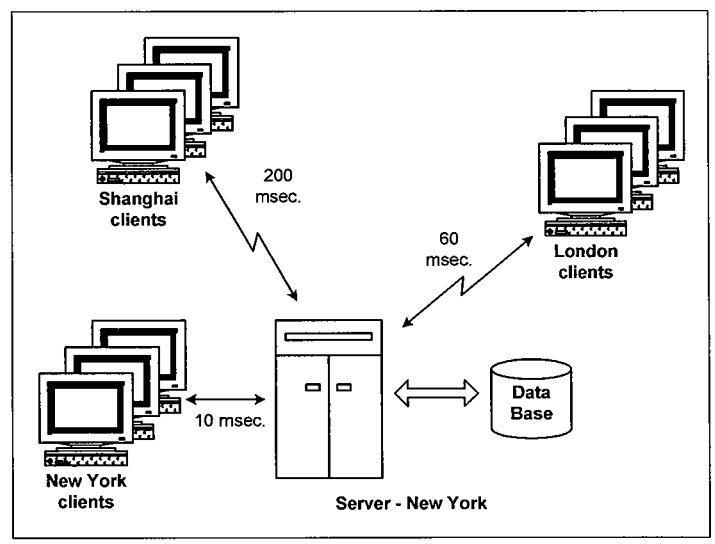
Figure 7:
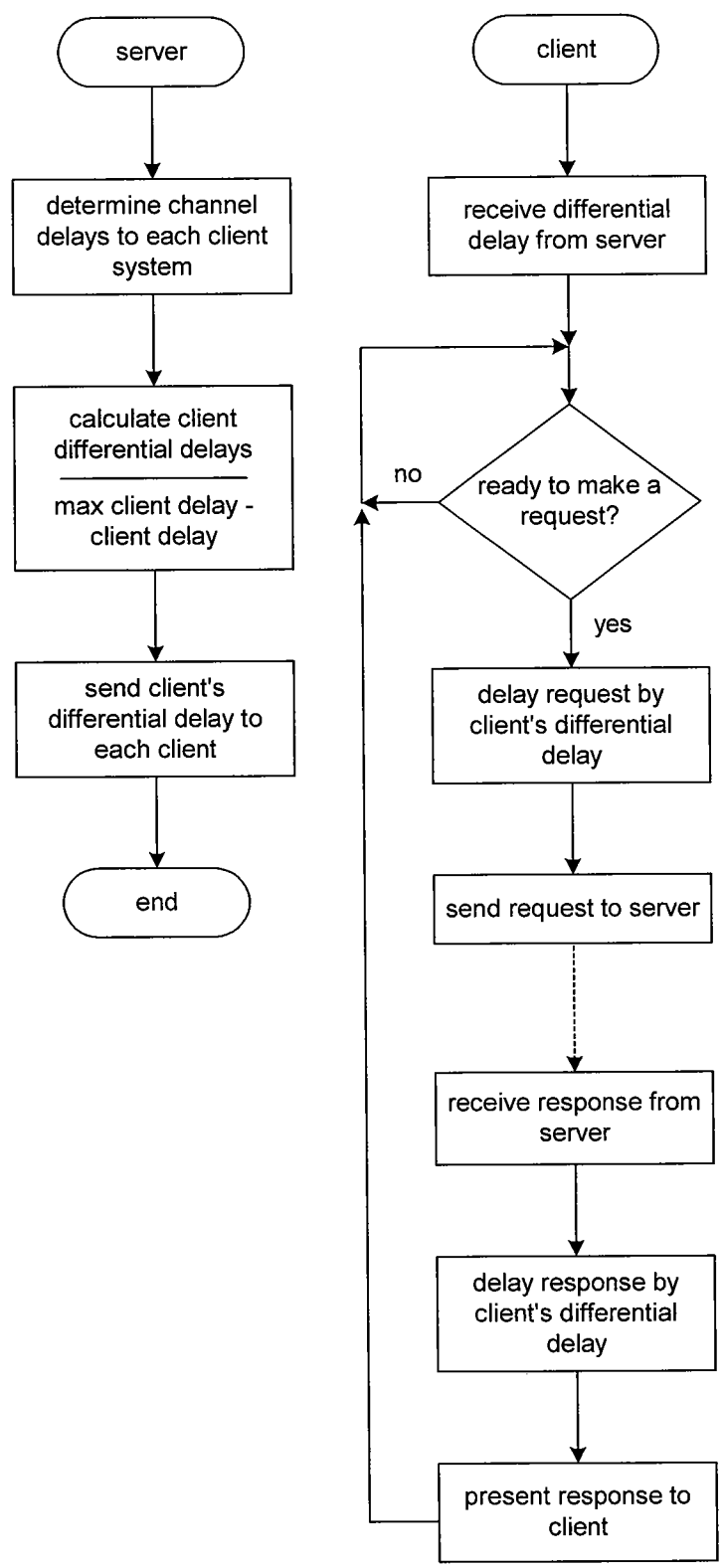
FIGS. 7 and 8 show flowcharts for client and server monitoring.
Figure 8:
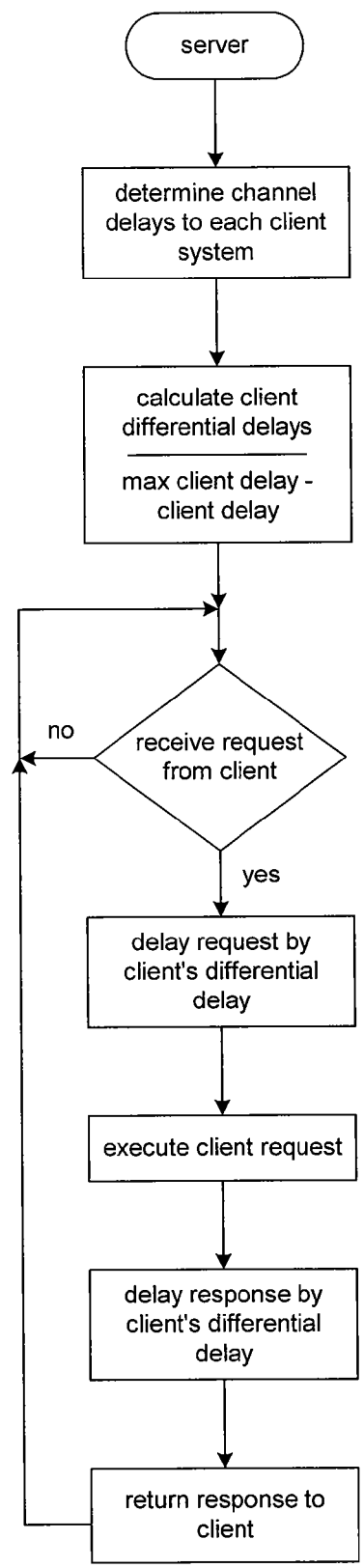

In many distributed systems, a central server can provide services to widely separated users (i.e. non co-located), as shown in FIG. 4. Furthermore, there may be multiple non co-located servers, each serving their own local community of users. Multiple copies of the database may be provided in the application network, with one or more servers having their own online database copy (FIG. 5). If multiple database copies are provided, their contents are kept synchronized by any one of many data synchronization techniques.

To be fair, all changes (manipulations) to all online database copies must be made according to the fairness criteria; and the amount of time that it takes for a user to access a particular data item or application service must also comply with the fairness criteria. Taking the simple fairness criteria case of equal query and update access for all users, fairness implies two restrictions:

a. The time delay from when a request is sent by a user to the time that it is processed by the server must be the same for all users. This is necessary so that two requests issued by different users will be processed by the server in the correct order. (Requests generated at exactly the same time could be ordered randomly or could be ordered according to some business rule.)

b. It must take the same amount of time for a response to a request to be received by all users. Otherwise, one user would be able to process the response and initiate a secondary action based on that response before another user who had made an earlier request. This includes changes to the database made as the result of a request, and requests to read data from the database.

For more complex fairness criteria, these restrictions are modified accordingly.

In the rest of this disclosure, for brevity, the fairness criteria are assumed to be equal query and update access. Those skilled in the art will readily be able to extend the examples to other more generalized fairness criteria.

The above restrictions can be accomplished via the prior art differential delay methods or via the more efficient methods of synchronized lock release and preprocessing as taught herein. Synchronized Lock Release ensures that all database changes (manipulations) are viewable at all servers at the same time. Preprocessing processes a request as soon as it is received but which appropriately modifies the results if it is determined that an earlier request had been generated by another node.

3. Synchronized Lock Release

One preferred embodiment of the present invention is to control access to all database changes at the same time across the application network by coordinating the release of locks on changed (manipulated) database items (corresponding objects).

A sequence of related changes (manipulations) made to the database is often referred to as a transaction. Changes include inserts of new data items, updates to existing data items, and deletions of existing data items. Changes made by a transaction are hidden from the view of the users and from other transactions by data object locks until the locks are released. One preferred embodiment of the present invention is to synchronize the release of locks across the network so that all locks are released simultaneously or according to a fairness criteria. Therefore, all users will see database changes at the time specified for them in the fairness criteria.

Each change (manipulation) to a database object row, record, field, column, table, file (or whatever the lock increment may be) requires that the object be locked. The lock is imposed either by explicit command or upon the application of a change to the object. While the object is locked, no user may view its value, and no other transaction may change its value. All locks on all objects are released upon command of the transaction initiator. This can either be an explicit lock release command, or it can be implicit in the commit of the transaction. Then, either the lock command can be delayed in its transit to each system, or each system can delay the execution of the lock release command by its differential delay. In this way, all locks are released at the same time, and thus the data changes become viewable to all users at the same time.

a. Locks i. Locks on Data Objects: When a transaction is begun, the contents of those data objects to be changed (manipulated) are hidden from the view of the users and from other transactions by locking them. A locked data object cannot be viewed by a user until it is later unlocked (some systems allow dirty reads, or the access of locked and possibly modified data), nor can it be changed by any other transaction. Only when the transaction is complete is it committed. At this time, the locks are released and the changed data objects become available to all users.

A lock may be acquired either by an explicit locking command that holds the data object for later update (and protects it from updates by other transactions) in a lock-update-unlock sequence, or it may be implicitly applied when a data object is updated in an update-unlock sequence. Depending upon the database involved, the lock granularity can be coarse or fine. Data objects that may be locked include entire tables or files (coarse granularity), rows or records, columns within a table, or specified fields (columns) in specified rows (fine granularity).

If there are distributed copies of the database throughout the network, a transaction may lock all copies of the data object across the network before applying any change to that object. These objects may be different across the systems if the systems are heterogeneous. For instance, the row format in one system might be different from that in another system. Alternately, a row of a table in one system might be a record in a file in another system.

ii. Mutexes: An alternative to locks on individual data objects is the use of mutexes. A mutex (mutual exclusion) object is a separate data object or data item that can be seized or granted to effectively lock an entire set of data objects. For instance, a mutex on an invoice number would represent all of the header information and line items in that invoice. In order to modify the invoice in any way, a transaction would have to acquire the mutex for that invoice. It could then make any changes that it wanted to the invoice. While it held the mutex, no other transaction could modify that invoice, and optimally no other reader could read that invoice. With a mutex, only one lock need be acquired rather than multiple locks on each individual copy of the data object.

iii. Global Mutexes: A global mutex is an extension of a mutex. A mutex is local to the system in which the database resides. If there are multiple copies of the database across the network, a global mutex may be used so that individual mutexes do not have to be acquired. There is only one global mutex for a data object in the network. In order to modify that object (such as the invoice described above), one must first acquire the global mutex for that object. This locks all such objects across the network so that they all can be changed (manipulated). When the global mutex is released, the changes in those data objects are now available across the network.

iv. Intelligent Locking Protocol: With locks and local mutexes, it is possible to create deadlocks. For instance, if two transactions need data objects A and B, but one transaction locks A first and the other locks B first, then neither can acquire the lock on the other data object that they need because that lock is being held by the other transaction. This is a deadlock, and either one transaction has to release its lock or both must release their locks and try again at a random time later. Deadlocks can generally be avoided via an intelligent locking protocol. Within a single system, it is sufficient that any process acquire locks in the same order.

However, in a distributed system, this is not sufficient. It is possible that two systems will acquire local locks on the same data item before they are aware that the other system is also attempting to lock that data item. Neither can then acquire the remote lock on the data item that they need in order to continue. This problem is solved by using global mutexes rather than local mutexes to control locking. In order to lock a data item, a system must acquire the global mutex. Once having done so, no other system can acquire that global mutex. Other systems must wait until the system that is holding the global mutex releases it. Nonetheless, even with global mutexes, all systems must acquire the global mutexes in the same order to prevent deadlocks.

b. Synchronized Lock Release Procedure

To ensure that the availability of a set of changes made by a transaction is available to all users at all nodes according to the fairness criteria, the release of locks across the network is synchronized. Lock release at each node is commanded by the transaction initiator either by an explicit command or commands, or it occurs implicitly when the transaction initiator commits the transaction at that node, thus informing the node that the transaction is complete.

To accomplish this, the lock release command and therefore the release of the lock must be delayed for each node by an amount such that the lock release command is received by each node at the same time that it is received by the slowest node. This requires the calculation of differential delay, as discussed earlier.

An exception to this is the global mutex. When it is released, in effect all corresponding locks across the network are released at the same time. Each node should delay the release of its locks according to its differential delay to the system holding the mutex to ensure fairness.

Figure 10:
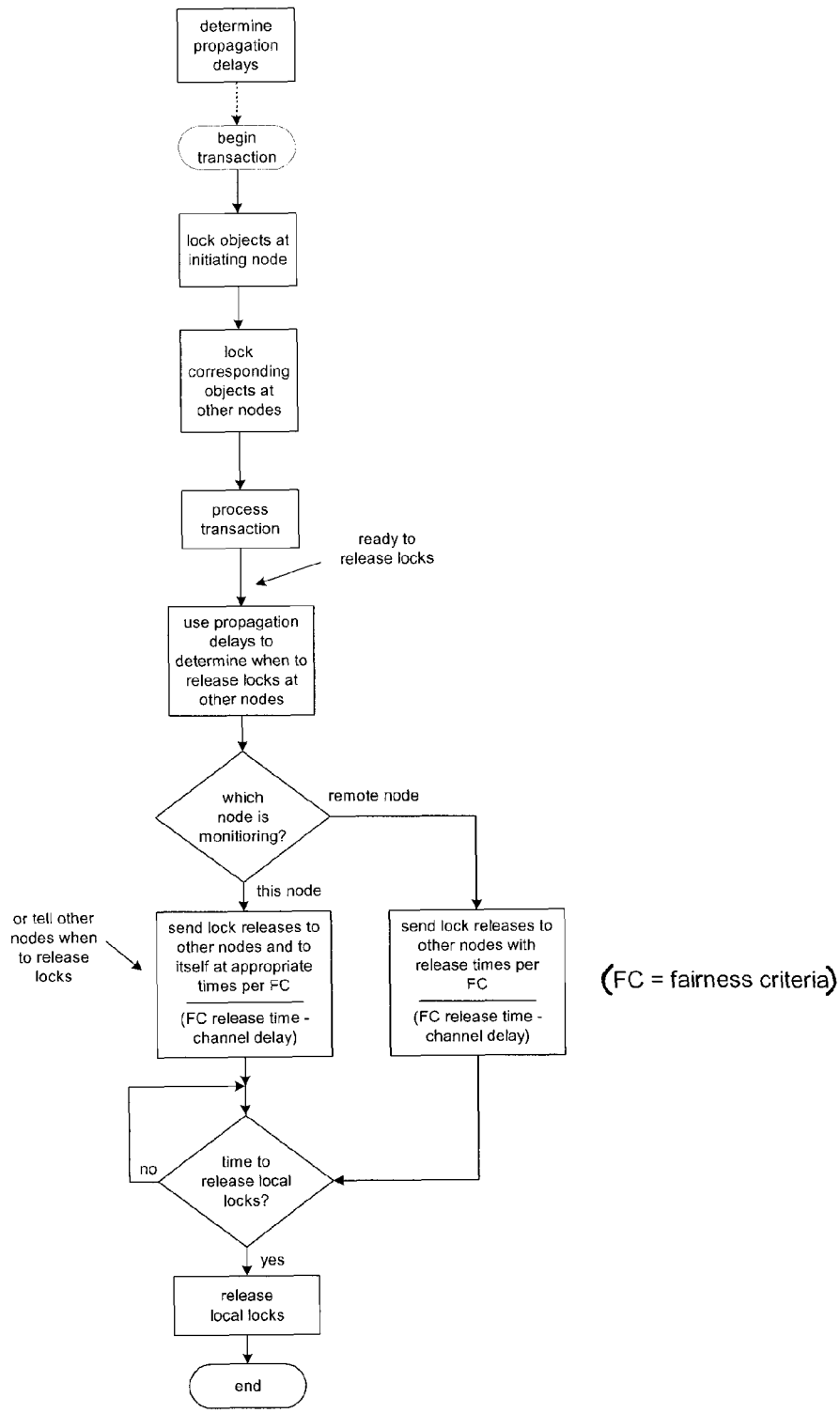
FIGS. 10 and 11 show flowcharts in accordance with preferred embodiments of the present invention.

The logic flow for synchronized lock release is shown in FIG. 10. The first step for the initiating server that is about to execute a transaction is to determine the channel propagation delay times to the other nodes in the application network. It may do this just before the execution of the transaction, or it may have previously made this measurement according to some measurement schedule. The channel propagation delay measurement may also be an average of several previous measurements of propagation time.

The server will then lock the objects that it intends to update in its database. It also locks the corresponding data objects in the remote databases that will be updated. It then performs the updates on the databases.

When the initiating server has finished processing the transaction and has determined that the locks should be released, it uses the propagation delays to determine when it should send a lock release command to each remote node. The server will send lock release commands to each node at the correct time to cause the remote node to release its locks according to the fairness criteria. This time is the fairness criteria-specified time for that node minus the channel delay to that node. The initiating server performs the same function for the local locks which it is holding so that its locks are released according to the fairness criteria.

Alternatively, the responsibility for monitoring channel delays could rest with each remote server. In this case, the initiating server will send lock release commands to all remote servers at the same time. However, in this case, the lock release command includes the delay that should be imposed as required by the fairness criteria. Each remote node will receive its command and will wait for an appropriate time (the fairness criteria time minus the channel delay between that node and the initiating node) before releasing its locks. The channel delay could either be calculated by the remote server and subtracted from the fairness criteria time sent by the initiating server, or it could be calculated by the initiating server and used to reduce the actual fairness criteria time sent to the remote server.

4. Preprocessing

Another preferred embodiment of the present invention is to increase efficiency by preprocessing a request as soon as it is received. However, the results of this preprocessing are held so that it can be determined if there was an earlier transaction initiated by another system. If such an earlier transaction is subsequently received, the results of the first transaction are modified to reflect the effects of the earlier transaction.

When an application running in a server that is doing differential delay monitoring receives a request from a user, it does not know if an earlier request has been generated by a more distant user until it waits for the differential delay time interval between the submitting user and the furthest user. Typically, it will delay processing of a request until this time interval has passed so that it can properly order all requests. However, in some applications, it may be feasible to begin processing a request immediately upon receipt. When the time interval has expired, the application can then make a final determination as to its responses.

For instance, consider a stock market in New York. A local user submits a buy order for 1,000 shares of a security. At some time later, a buy order for 500 shares of the same security is received from a user in California. The California order is determined to have been generated before the New York order and must be given preference.

As soon as the New York order is received, the execution application could begin processing the New York order for 1,000 shares. Perhaps it can get 300 shares at $10 and 700 shares at $11. It then receives the earlier California order for 500 shares and satisfies it with the 300 shares at $10 and 200 shares at $11. It completes the New York order for 1,000 shares with the remaining 500 shares at $11 and an additional 500 shares at the then current market price.

The advantage of preprocessing is that the average response time of the system is reduced. This is not only advantageous to all users, but it narrows the fraud window that might be advantageous to a dishonest user.

Figure 11:
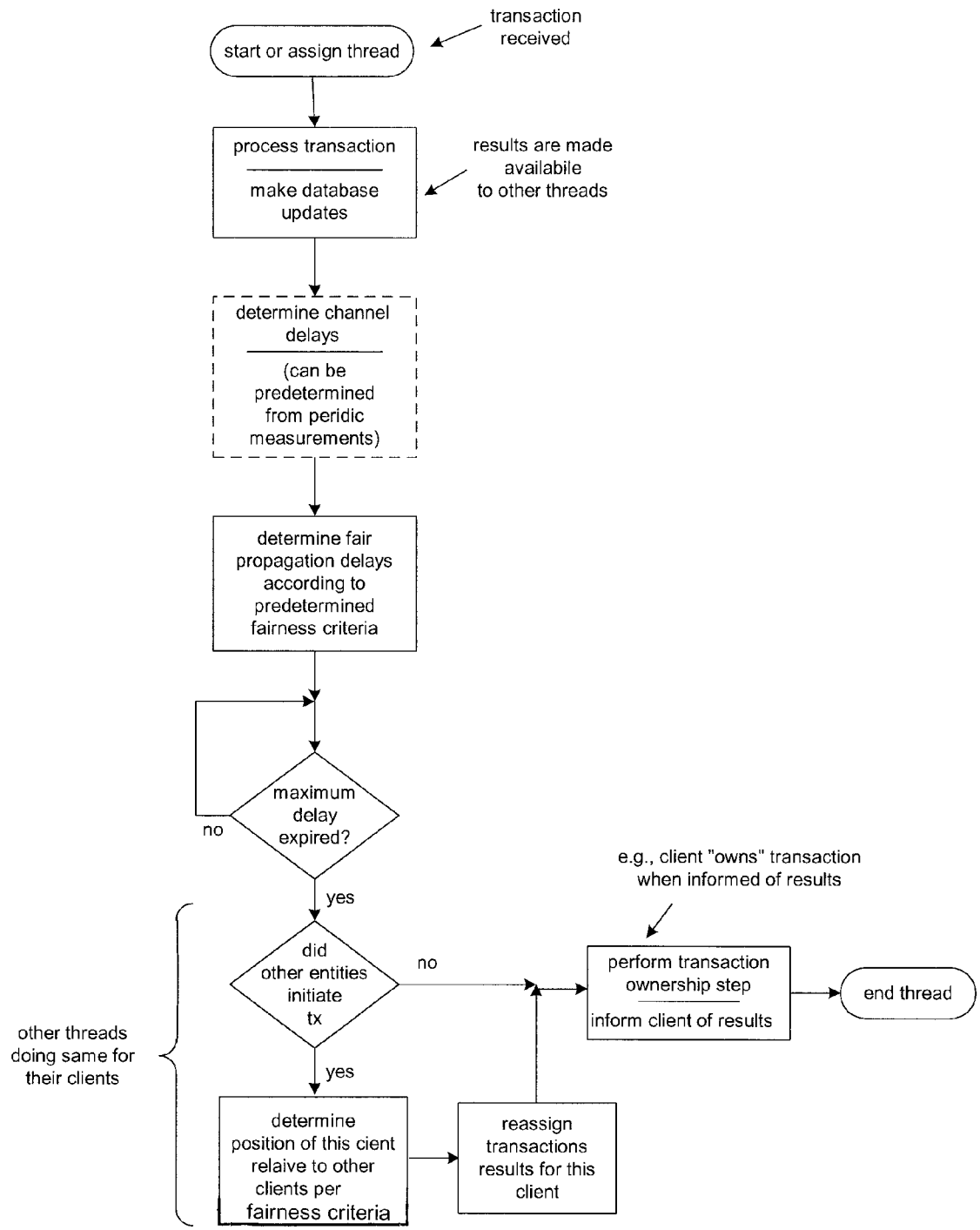

The logical flow for preprocessing is shown in FIG. 11. When a server receives a transaction from a client to be executed, it starts or assigns a thread that will process that transaction. A thread is an independent processing path through the server. Several threads may be active at once. There are several implementations of threads, such as the native threads in Unix, separate processes handling each transaction, or multiplexed transactions being handled within a single process.

The transaction thread processes the transaction and makes those database updates which would be made on behalf of the transaction assuming that it were allowed to complete. It makes this result available to the other transaction threads, if any, through an interthread communication mechanism such as shared memory.

The thread then calculates the maximum time that it must wait to see if any other transactions arrive from remote clients that should be processed ahead of this transaction according to the fairness criteria. To do this, it needs to know the propagation times to all of the remote clients. It can measure the client propagation delays at this time, or it can use propagation delays that have been previously (and perhaps repetitively) measured. The thread thus determines the maximum time that it must wait to ensure that all transactions which might have been initiated prior to its transaction have arrived at the server. Each of these other transaction will be assigned their own processing thread by the server, and each of these threads follows the processing of FIG. 11.

Once this time has expired, the thread checks the results of the other threads, if any, to see if any transactions had been received that had been initiated earlier. If not, the database updates for its transaction that it had determined earlier are appropriate, and the client is informed of the results. At this point, the client owns the transaction. That is, the client completes the transaction ownership step with itself as the transaction owner.

If one or more earlier transactions had been received, then the thread determines the relative position of its client to the earlier clients per the fairness criteria. It arranges the transactions from those clients along with its own transaction in time-order according to the fairness criteria. The updates made by earlier transactions are available to this thread through the interthread communication mechanism described earlier.

The thread determines which of the database updates made by earlier transactions affect the same data objects that the thread wants to update. These updates are logically ordered so that the proper updates for the thread's transaction can be determined. These updates are then assigned to the thread's transaction, and the client is informed of the results. That is, the client completes the transaction ownership step, perhaps with a different client as the transaction owner.

Alternatively, threads with conflicting transactions could coordinate among themselves via the interthread communication mechanism to execute their transactions one at a time according to the order specified by the fairness criteria.

5. Active/Active Systems a. The Active/Active Architecture

Figure 9:
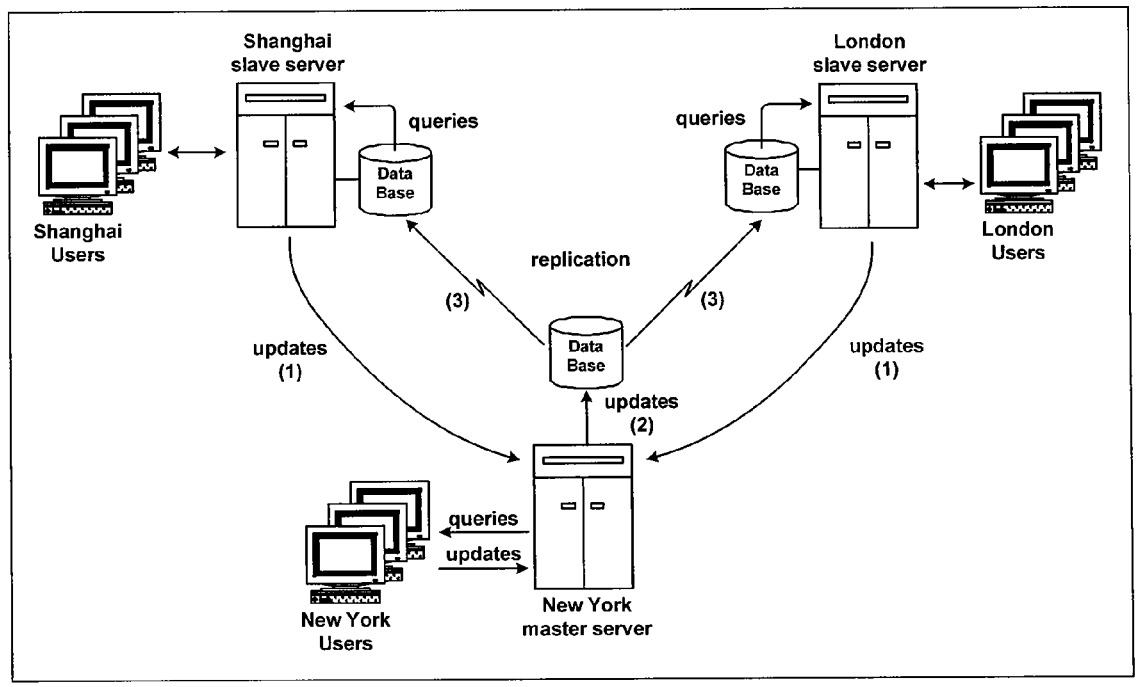
FIG. 9 shows an additional hardware architecture for accessing databases.

The technique described earlier for information read-only locality, as shown in FIG. 9, improves network performance for database information reads, but information update activity must still flow across the network. This can significantly and negatively impact transaction response time. In some applications, fast response time is as important as fair database access.

To overcome the response-time problem, it is necessary not only for there to be remote nodes servicing the read activities of local communities of users, but also for these nodes to support local updates. This role can be fulfilled by allowing each node to not only support read access to its clients but to allow its clients to update its local database copy. Any update made to one database copy must then be replicated to the other database copies in the network. This distributed system is known as an active/active system.

An active/active system is a network of processing nodes and database copies participating in a common application, as shown in FIG. 5. Typically, each node has access to at least two copies of the database so that it can survive the failure of a database. However, there may be any number of database copies in the application network. The database copies must be kept in synchronism so that they each properly reflect the current application state. This is accomplished by replicating changes made to one database to all of the other database copies. Therefore, an update request such as a transaction may be routed to any processing node in the network. Updates to the application database made by that node are reflected in all database copies as a result of the replication activity.

For instance, FIG. 5 shows an active/active system configured for locality. There are several processing nodes, each serving a local community of clients. Each processing node has its own copy of the application database. The database copies are kept in synchronism with each other through data replication. For instance, if a user at processing node 1 submits a transaction, processing node 1 will execute it and will update its copy of the database. These updates are also applied to the database copies at processing nodes 2 and 3 via the replication facility.

From a fairness viewpoint, active/active systems are an extension of the master/slave systems described above, which provide read-only locality. Measurements are periodically made of the propagation delay between each pair of nodes and between each node and the clients which it is serving, and the matrix of differential delays is calculated by each node. When an update is made by one node, and that update is replicated to the other nodes, each node including the initiating node must wait its nodal differential delay relative to the initiating node before releasing the locks on the changed data. This provides fair access to newly changed data across the network.

The above process provides fair access at a node level. Each node must also measure the propagation delay to each of its clients. In the case of active/active systems, the maximum client propagation delay measured by each node must be sent to all other nodes; and each node will choose that client propagation delay that is the greatest among all of the maxima reported by the nodes. It is this value that is used to calculate a differential delay for a node's clients, to be imposed by the node or alternatively by its clients. Adding these delays now makes the system totally fair in terms of both database changes and read accesses.

Alternatively, rather than coordinating lock releases, each node may delay the replication of data to each of the other nodes based on its differential delay with those nodes.

b. The Replication Engine

Active/active systems typically use a data replication engine to replicate changes from one database copy to another. There are two types of replication engines—asynchronous and synchronous. An asynchronous replication engine replicates changes as they occur without locking the entire set of data objects within the scope of the transaction. Synchronous replication engines lock all the changed data objects as they are changed and release them at transaction commit time. However, the fairness techniques described above apply to both.

There is one caveat, though. A replication engine adds a data-transfer delay known as the "replication latency" that may be significant relative to the communication propagation time. Therefore, when measuring propagation time, care must be taken to include the replication latency of the replication engine. Propagation time should be measured from when the update is made to the source database to when it is delivered to the database engine at the receiving side. This time will include not only communication propagation time but also the replication latency of the replication engine.

c. Delay-Independent Configurations

The active/active architecture can be used in other ways to achieve fairness without having to measure channel delays. In effect, every transaction is forced to go over equivalent network paths to ensure that all requests from clients and replies to clients take the same amount of time.

The previously described methods require that the communication delays between the clients and servers be measured, and that these delays be used to selectively delay request and response processing so that all clients are treated fairly. One method involved active/active application networks to provide local query and update access to clients.

However, fairness can be achieved without having to measure communication delays. Basically, a transaction initiated by any client involves its remote node to complete transaction processing. In this way, some portion of the processing for each transaction must flow across the network, and, as a consequence, all access to newly published data will be accessible to all users at the same time. Access to published data is provided locally by each node.

Figure 12:
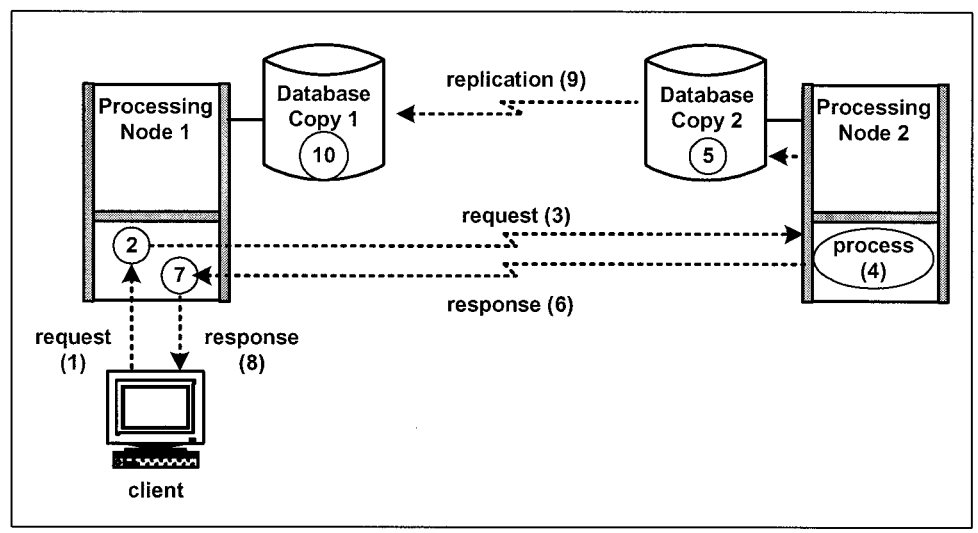
FIGS. 12-15 show additional hardware architectures for accessing databases.

FIGS. 12, 13, 14, and 15 show some implementations of this strategy. Each example shows a variation of the portion of transaction processing that involves the remote node.

i. Remote Processing, Remote Response: FIG. 12 shows a system in which each transaction is processed by the remote node, and the response to the client is returned by the remote node. FIG. 12 illustrates two nodes in an active/active application network. Processing Node 1 contains its Database Copy 1 of the application database, and Processing Node 2 contains its Database Copy 2 of the application database. These databases are kept synchronized by data replication, so that changes made to either database are immediately reflected in the other database.

Figure 13:
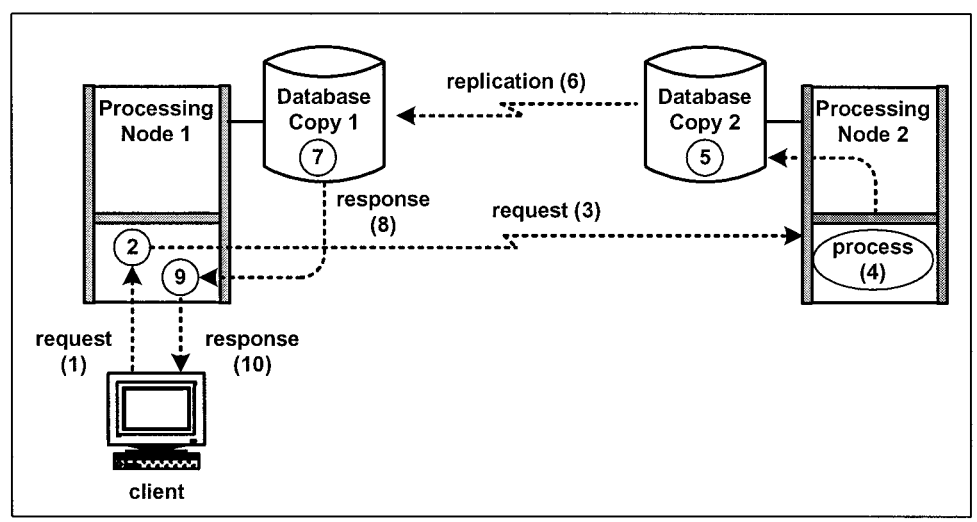

When the client initiates a transaction request to its node (1), the transaction is forwarded (2) to the remote node (3). There it is processed (4), and node 2 updates its database with the result (5). A response (6) is returned to the originating node. The originating node forwards (7) the response to the originating client (8). In the background, the modifications made to Database Copy 2 are replicated (9) to Database Copy 1 (10) to maintain the databases in synchronism.

ii. Remote Processing, Local Response: FIG. 13 shows the same active/active system of FIG. 12 with remote processing of transactions, but with responses to the clients generated locally instead of by the remote node.

Figure 14:
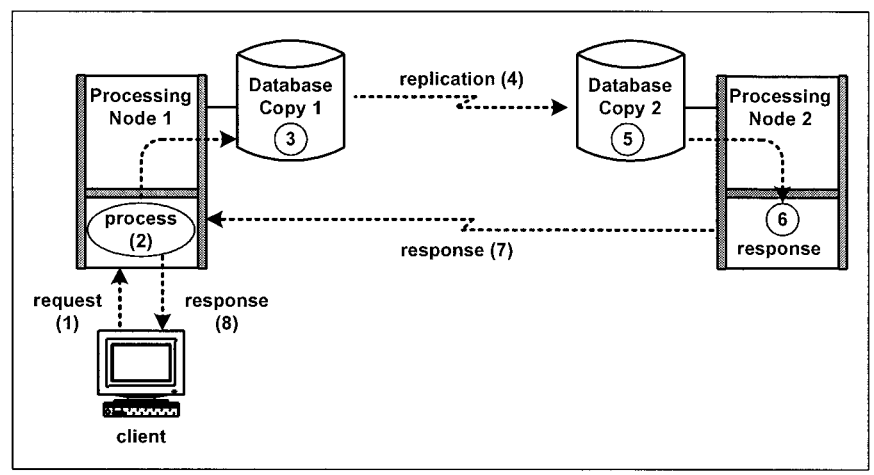

The client-initiated transaction request (1) is forwarded (2) to the remote node (3). There it is processed (4). As part of the transaction processing, the remote database copy (5) is updated. These database modifications are replicated (6) to the originating node where the database of the originating node is updated (7). When the database copy at the originating node receives the commit command for the transaction via the replication channel informing it that the transaction has successfully completed, it will generate a response (8) which will be received by the originating node (9). The originating node will pass this on to the client as a response to its transaction request (10).

iii. Local Processing, Remote Response: FIG. 14 shows the same active/active system of FIG. 12 except that the processing of a transaction is performed at the originating node. However, the response to the client is generated by the remote node.

Figure 15:
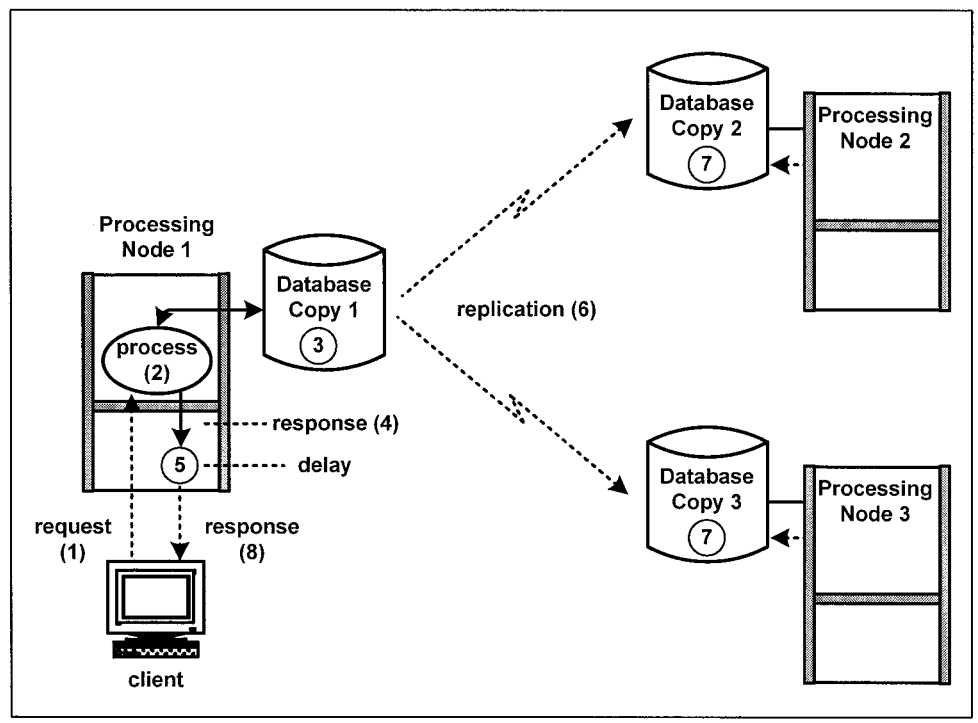

In this case, the client-initiated request (1) is processed at the client's node (2). As a result of this processing, the originating node's database copy is updated (3). These updates are replicated (4) to the remote node where they update the remote database copy (5). When the remote database copy receives the commit command, indicating that the transaction has successfully completed, it will generate a response (6) to the remote node. This will cause the remote node to send a completion response (7) to the originating node. The process function (2) at the originating node will receive this response and forward it to the client (8).

iv. Local Processing, Local Response: Coordination with other nodes in the application network can be avoided by simply imposing a sufficiently large fixed delay on all response delivery within each node, as shown in FIG. 15. This delay is chosen to be very much greater than the maximum delay between any user and any node in the network imposed by the communication channels so that variations in communication delay time are immaterial. If desired, this delay could be adjusted by each node via client side or server side monitoring as described earlier to minimize variations in communication latency.

Alternatively, this same result can be achieved via a "publish" mechanism. When a change is being made, all nodes decide on a future time to publish that set of data and to make it available to their users. In this way, the nodes do not have to exchange extra messages. They simply agree to set the publish time far enough ahead to make sure that all nodes can make it available by that time. The publish time could be contained in the update message, and it can be regulated by server side or client side monitoring to minimize variations in communication latency time.

As shown in FIG. 15, a user at one node will generate a request of some sort (1). This request will be received by his local node and processed (2). This processing may result in the update of certain data in its local database (3), and a result (4) is returned to the user by the processing program (2). However, this result is delayed by the specified fixed delay (5) or until the specified publish time before returning it to the user.

In the meantime, the updates to the local database (3) are replicated (6) to the other database copies in the application network (7). Finally, after the fixed delay has expired or the agreed-upon publish time has arrived, the response is returned to the user (8). Given a fixed delay that is large enough or a publish time that is far enough in the future, each user in the network will experience approximately the same delay in seeing the results of any database update made by any node in the network.

If a request does not update the database (i.e., it is simply a query), the results can be returned immediately without waiting for the specified delay time to expire. All users will get immediate local responses to their queries.

For instance, consider a fairness criteria that states that there will be no more than a 1% variation in the time that it takes to service all users in the network. Assume that there are two nodes, one in New York and one in Shanghai. Assume that the furthest user serviced by the New York node is in Boston, and the furthest user serviced by the Shanghai node is in Moscow. Clearly, the delay between a Moscow user and the New York node will be the longest delay experienced by users of the system. If this delay is 600 milliseconds in each direction, then a fixed delay of 60 seconds might be chosen. All responses are delayed by 60 seconds. Thus, variations in communication delays ranging from zero to 600 milliseconds will have only a 1% impact on the fairness of requests and replies (600 milliseconds divided by 60 seconds).

This solution is not limited to two nodes. It can be applied to an application network comprising any number of nodes.

6. Other Considerations

Other considerations relating to fairness methods include the following:

a. Prioritized Release

According to some fairness criteria, it may be required that the release of data to users be governed by some priority accorded to their system or by some priority accorded to the individual clients. Furthermore, the release of data to some servers or clients may be required to be delayed by a fixed amount of time relative to when other servers or clients receive that data.

Prioritized release can be guaranteed with differential delays. Knowing how long it takes for a data update to reach each server and/or client, the data can be released to the highest priority server and/or clients immediately (or if several such servers or clients are to get immediate release, the data is released to these according to their differential delays). Time increments then can be added to the differential delays of other servers or clients to ensure that they receive delivery of data in the proper order according to the fairness criteria.

b. Delayed Release

In other fairness criteria, it may be required that data changes are not delivered to some or all clients for a specified period of time. For instance, stock market data may be released to subscribers of an information service immediately, but delayed by fifteen minutes before it is released to nonsubscribers. Again, it is only necessary to add the specified delay time to the differential delays to achieve fairness in this situation.

c. Encryption

Encryption between the nodes and the clients can minimize the potential for fraudulent activity. Without encryption, it would be possible, for instance, for a malicious client to imitate a server node and to broadcast a message containing a maximum client communication delay that is much larger than the actual measured delay. If the system is implemented so that fairness delays are a responsibility of the clients, all other clients would delay their requests and responses more than what is necessary. The malicious client could comply with the measured delay and have an advantage over the other clients. With proper encryption, each client could guarantee that the broadcast came from the server and not from some other source. Malicious broadcasts would simply be discarded.

d. System Startup

When the system is first started, all clients should measure their own delay, report these to the server, and receive the maximum delay or their differential delays from the server so that they can properly delay their requests and response processing. Alternatively, the server could measure the delays to its clients and send these to the clients. Until the server broadcasts the delay messages, it should process no transactions from the clients. To ensure fairness of the first transactions, the server should delay this startup message to each client by its differential delay so that all clients will receive the startup message at the same time.

e. Fairness Criteria Resolving Element

Figure 16:
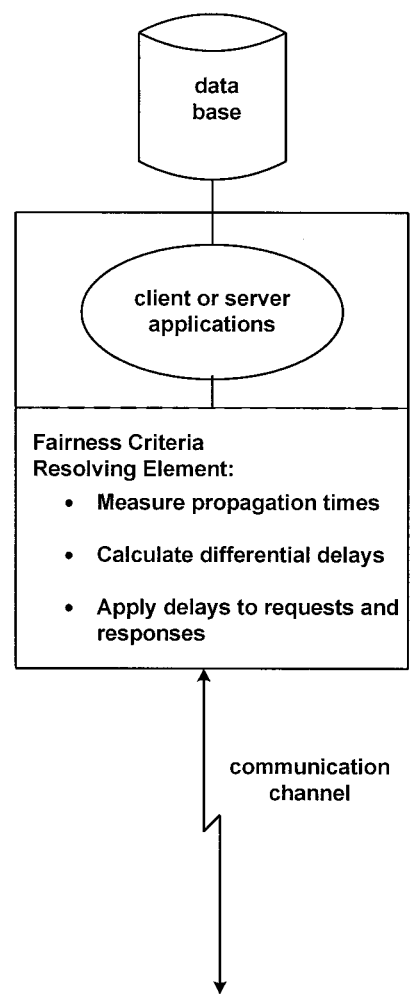
FIG. 16 shows a fairness criteria resolving element.

The calculation of the differential delay (also referred to herein as the "fair propagation delay time period") for each client and server and the application of this delay to requests and responses is a common function. This may be implemented as a Fairness Criteria Resolving Element, a common facility to be used by each system. This facility would sit between the client or server system and the communication line, as shown in FIG. 16. It would perform the following functions:

i. periodically query the remote system to determine the propagation time to that system.

ii. report its measured propagation time to the remote system.

iii. receive from the remote system the propagation time from that system to itself as well as other system maximum propagation times (such as that to the furthest remote client).

iv. calculate the differential delay to the remote system.

v. calculate any additional differential delay to be added due to a remote client that has the greatest propagation delay.

vi. delay each request to the remote system and each response from the remote system by the differential delay if its system is responsible for delays.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. A computer-implemented method of performing transactions on objects held in a database in accordance with fairness criteria, wherein two or more entities are capable of initiating transactions to the database, each transaction including (i) one or more transaction steps or operations, and (ii) a transaction ownership step, the fairness criteria defining rules for determining a fair propagation delay time period that must pass after transaction initiation, the method comprising:
   (a) one of the entities initiating a transaction on an object at the database;
   (b) immediately processing the steps or operations of the initiated transaction up to the transaction ownership step;
   (c) determining propagation delays between the database and at least some of the other entities that are capable of initiating transactions to the database;
   (d) using the propagation delays and the fairness criteria to determine the fair propagation delay period; and
   (e) upon determining that the fair propagation delay period has been exceeded, detecting whether any of the other entities initiated a transaction on the same object during the fair propagation delay time period, and if not, then the transaction initiating entity performing the transaction ownership step on the transaction initiated in step (a).

2. The method of claim 1 wherein step (e) further comprises using the propagation delays and the fairness criteria to resolve the entity that is entitled to perform the transaction ownership step on the initiated transaction when it is detected that another entity has initiated a transaction on the same object during the fair propagation delay time period.

3. The method of claim 1 wherein the fairness criteria propagation delay is the longest propagation delay of the other entities minus the propagation delay of the initiating entity.

4. The method of claim 1 wherein the fairness criteria is defined by business rules.

5. The method of claim 1 wherein the object is a database table.

6. The method of claim 1 wherein the object is a row of a database table.

7. The method of claim 1 wherein at least some of the entities are not co-located, and the propagation delay is a communication delay.

8. The method of claim 1 wherein at least some of the entities are co-located, and the propagation delay is the result of application delays associated with the different entities.

9. The method of claim 1 wherein step (c) is performed at periodic time intervals.

10. An article of manufacture for performing transactions on objects held in a database in accordance with fairness criteria, wherein two or more entities are capable of initiating transactions to the database, each transaction including (i) one or more transaction steps or operations, and (ii) a transaction ownership step, the fairness criteria defining rules for determining a fair propagation delay time period that must pass after transaction initiation, the article of manufacture comprising a non-transitory computer-readable medium encoded with computer-executable instructions for performing the steps of:
   (a) one of the entities initiating a transaction on an object at the database;
   (b) immediately processing the steps or operations of the initiated transaction up to the transaction ownership step;
   (c) determining propagation delays between the database and at least some of the other entities that are capable of initiating transactions to the database;
   (d) using the propagation delays and the fairness criteria to determine the fair propagation delay period; and
   (e) upon determining that the fair propagation delay period has been exceeded, detecting whether any of the other entities initiated a transaction on the same object during the fair propagation delay time period, and if not, then the transaction initiating entity performing the transaction ownership step on the transaction initiated in step (a).

11. The article of manufacture of claim 10 wherein step (e) further comprises using the propagation delays and the fairness criteria to resolve the entity that is entitled to perform the transaction ownership step on the initiated transaction when it is detected that another entity has initiated a transaction on the same object during the fair propagation delay time period.

12. The article of manufacture of claim 10 wherein the fairness criteria propagation delay is the longest propagation delay of the other entities minus the propagation delay of the initiating entity.

13. The article of manufacture of claim 10 wherein the fairness criteria is defined by business rules.

14. The article of manufacture of claim 10 wherein the object is a database table.

15. The article of manufacture of claim 10 wherein the object is a row of a database table.

16. The article of manufacture of claim 10 wherein at least some of the entities are not co-located, and the propagation delay is a communication delay.

17. The article of manufacture of claim 10 wherein at least some of the entities are co-located, and the propagation delay is the result of application delays associated with the different entities.

18. The article of manufacture of claim 10 wherein step (c) is performed at periodic time intervals.

* * * * *